(12) United States Patent
Kawasaki (10) Patent No.: US 6,339,478 B1
(45) Date of Patent: Jan. 15, 2002

(54) IMAGE FORMING APPARATUS FOR FORMING A PLURALITY OF SCREENED IMAGES

(75) Inventor: Eiichiro Kawasaki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 08/944,339

(22) Filed: Oct. 6, 1997

(30) Foreign Application Priority Data

Mar. 10, 1997 (JP) ............................................. 9-054967

(51) Int. Cl.[7] .................... B41B 15/00; B41J 15/00; H04N 1/21; H04N 1/40
(52) U.S. Cl. ...................... 358/1.17; 358/1.9; 358/298; 358/455; 358/456; 358/534; 358/535; 358/536
(58) Field of Search .............................. 358/1.9, 1.17, 358/455, 456, 536, 534, 535, 298, 515

(56) References Cited

U.S. PATENT DOCUMENTS 5,146,554 A    9/1992 Statt
5,920,685 A  * 7/1999 Romano et al. ............ 358/1.15

FOREIGN PATENT DOCUMENTS

JP    4-10960    1/1992
JP    4-26273    1/1992

* cited by examiner

*Primary Examiner*—Kimberly A. Williams
*Assistant Examiner*—Twyler Lamb
(74) *Attorney, Agent, or Firm*—Burns, Doane, Swecker & Mathis, LLP (57) ABSTRACT

An image forming apparatus includes an image reader for reading images, a memory for storing images read by the image reader, a compression circuit for compressing an arbitrary portion of an image placed on a page memory, a compressed image memory for storing images compressed by the compression circuit, a decompression circuit for decompressing images placed on the compressed image memory, a page memory for developing images decompressed by the decompression circuit, and a printer for outputting images on the page memory. When a plurality of images stored in the memory are to be screened, combined on the page memory and to be output, the images are developed such that screen patterns of respective images to be combined are superposed on the page memory. As a result, an image forming apparatus which is capable of screening, combining and printing a plurality of stored images without increasing memory capacity is provided.

22 Claims, 12 Drawing Sheets

IMAGE I

FIG.4B

IMAGE II

FIG.4C

IMAGE III

FIG.5A

SCREEN PATTERN $\alpha$

FIG.5B

SCREEN PATTERN $\beta$

IMAGE FORMING APPARATUS FOR FORMING A PLURALITY OF SCREENED IMAGES

BACKGROUND OF THE INVENTION

1. Field of the Invention

The present invention relates to an image forming apparatus and, more specifically, to an image forming apparatus such as a digital copying machine so structured as to develop an image once on a page memory at the time of image data output.

2. Description of the Related Art

Recently, in a digital copying machine with a memory, editing operation of screening a read image to produce a halftone image and combining with another read image has come to be performed.

For example, U.S. Pat. No. 5,146,554 discloses a technique of shading data developed by a character generator. Japanese Patent Laying-Open No. 4-26273 discloses a technique enabling registration of screen pattern read by a scanner in an apparatus performing screening on an original.

Further, Japanese Patent Laying-Open No. 4-10960 discloses a technique of screening printed characters only, in a printer.

However, when a plurality of images are to be screened and combined to be output, it is necessary to perform screening operation on images developed in separate areas, and to superpose respective screened images. More specifically, a first image is developed in a page memory for output and screening, the second and the following images are developed in different areas for screening, and the screened images are superposed on the page memory for output. As a result, extra memory corresponding to the area for screening is required, increasing cost.

In addition, when a plurality of images are to be screened with different densities to be combined, it is necessary to screen the images developed on separate areas, and to superpose the screened images thereafter. As a result, in this case also, extra memory corresponding to the area for screening is required, increasing cost.

SUMMARY OF THE INVENTION

Therefore, an object of the present invention is to provide an image forming apparatus capable of processing at a low cost when an image is to be formed by screening and combining a plurality of images.

Another object of the present invention is, in an image forming apparatus, to form an image by screening and combining a plurality of images with small memory capacity.

A further object of the present invention is to provide an image forming apparatus capable of processing with small memory capacity when an image is to be formed by screening and combining a plurality of images.

The above described objects are attained by the image processing apparatus including an image reader for reading images and a printer for printing images read by the image reader, characterized by a page memory for developing, with screening, a plurality of images read by the image reader, and a controller for developing data of the plurality of images on the page memory such that screen patterns of the data of the plurality of images are superposed on the page memory.

When the plurality of images read by the image reader are combined and output, the screened images are developed on the page memory such that the screen patterns of the images are superposed. Therefore, it becomes possible to develop images on the same area in the page memory, and it becomes unnecessary to develop screened images on separate areas when the screened images are to be superposed. Therefore, the page memory can be reduced by that amount.

As a result, an image forming apparatus capable of processing at a low cost when an image is to be formed by screening and combining a plurality of images is obtained.

According to another aspect, the image forming apparatus includes an image reader for reading images and a printer for printing the images read by the image reader. The image forming apparatus includes a page memory for developing, with screening of mutually different densities, data of the plurality of images read by the image reader, and a controller for developing data of the plurality of images on the page memory such that screen pattern of lower density on the data of the plurality of images is covered by a screen pattern with higher density.

In a structure in which images read by the image reader are developed on a page memory and output, when a plurality of images with different densities are to be screened, combined and output, the images are displayed on a page memory such that screen patterns of respective screened images are superposed with each other and that a screen pattern having lower density is covered by a screen pattern having higher density. Accordingly, it becomes possible to develop images on the same area of a page memory, it becomes unnecessary to develop screened images on separate areas when the screened images are to be superposed and, by that amount, the page memory can be reduced.

As a result, an image forming apparatus capable of screening a plurality of images with smaller memory capacity is provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
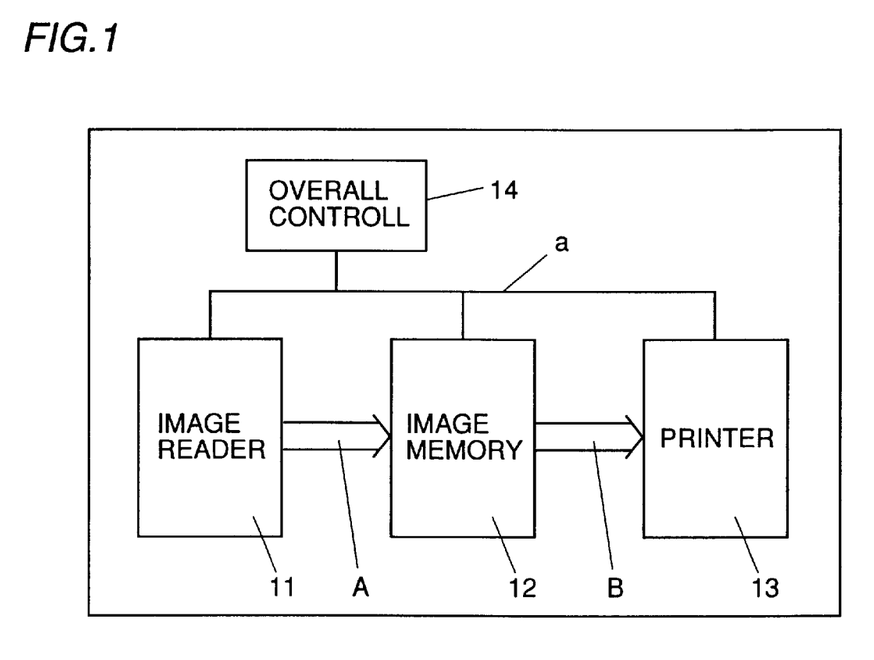
FIG. 1 is a block diagram showing a schematic structure of an example of a digital copying machine.

Referring to FIG. 1, the digital copying machine includes an image reader 11 for reading an image from an original, an image memory 12 for storing a plurality of read images, a printer 13 for printing the read images and a controller 14 controlling the overall apparatus.

Image reader 11 is a scanner capable of reading image data in digital manner from an original by means of a CCD, for example, and it can read originals continuously. Image memory 12 includes an RAM storing image data, a compression/decompression circuit and so on, and it is capable of storing, in compressed form, a plurality of images in the RAM. Printer 13 forms images on a sheet by electrophotography.

Image reader 11, image memory 12 and printer 13 are connected by image buses A and B. A control signal line a is for providing timing of original feed, reading, paper feed and printing, and it passes commands designating start of operation and status indicating the present status. Image bus A is for transferring image read by image reader 11 to image memory 12, and image bus B is for transferring image in image memory 12 to printer 13.

When copying operation is to be performed, an original read instruction is transmitted through control signal line a to image reader 11. Image reader 11 transfers the read image to image memory 12 through image bus A. The image stored in image memory 12 is transmitted to printer 13 through image bus B. In printer 13, by the instruction through control signal line a from image memory 12, an image is formed on the sheet, keeping synchronization with image signals.

Digital copying machine 1 is capable of storing a plurality of images in image memory 12. Therefore, it is possible to print a number of times the same original, or to change order of printing, by storing images read by image reader 11 in image memory 12 and transmitting the same image a number of times to printer 13.

Figure 2:
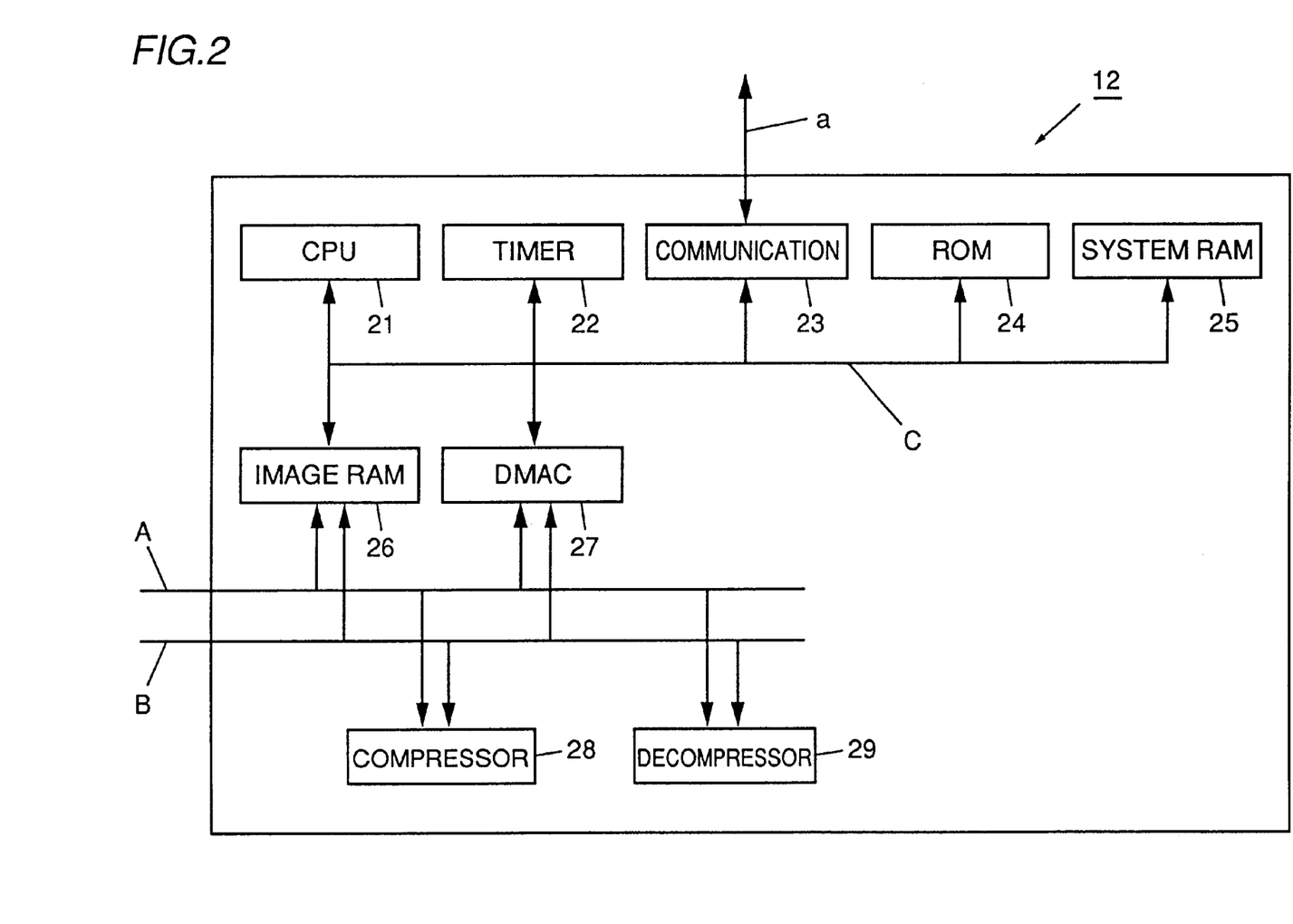
FIG. 2 is a block diagram showing an internal structure of an image memory portion of the digital copying machine shown in FIG. 1.

FIG. 2 is a block diagram showing internal structure of image memory 12 shown in FIG. 1.

Referring to FIG. 2, in image memory 12, CPU 21 controls in accordance with the program procedure stored in an ROM 24.

Further, it communicates with image reader 11 and printer 13 through control signal line a, by using a communication driver 23.

Further, CPU 21, a timer 22, communication driver 23, ROM 24, a system RAM 25, an image RAM 26 and a DMAC (Direct Memory Access Controller) 27 are connected by a system bus C.

Image buses A and B are connected to image RAM 26, and images are stored in image RAM 26. Image transfer control is performed by DMAC 27 which is capable of transferring several channels. Further, a compressor 28 and a decompressor 29 are connected to image buses A and B, enabling compression and decompression expansion.

Information of the images stored in image RAM 26 is stored in system RAM 25. System RAM 25 also stores parameters necessary for operating a program and so on.

ROM 24 stores a plurality of screen patterns of minimum repetition unit. It is possible for the CPU 21 to read a stored screen pattern and write the pattern in image RAM 26.

Figure 3:
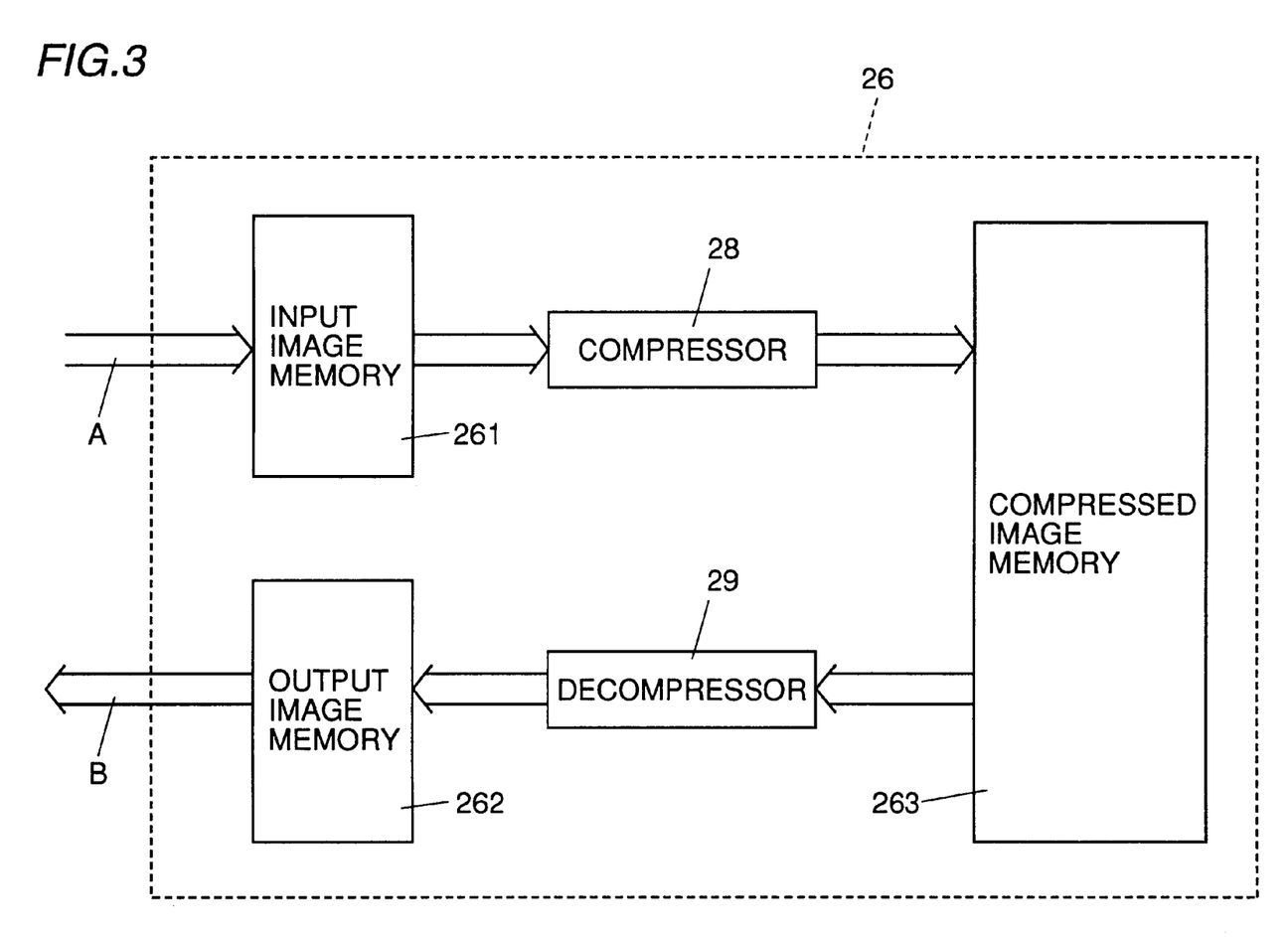
FIG. 3 is a block diagram showing flow of image data in the image memory portion of the digital copying machine shown in FIG. 1.

FIG. 3 is a block diagram showing flow of image data in image memory 12 shown in FIG. 1.

Referring to FIG. 3, image RAM 26 shown in FIG. 2 is divided into an input image memory 261, an output image memory 262 functioning as a page memory, and a compressed image memory 263. Image transfer between each of the memories is performed by DMAC 27 shown in FIG. 2. By designating a transfer address and transfer size in DMAC, image data is transferred. Further, by reading a transfer counter in DMAC 27, it is possible to confirm to which position an image has been transferred.

An image read by image reader 11 shown in FIG. 1 is stored in input image memory 261 through image bus A. As described above, by reading the transfer counter of DMAC 27, it is possible to confirm to which line of input image memory 261, the image has been transferred. The image stored in input image memory 261 is compressed by compressor 28 and transferred to compressed image memory 263.

The image placed in compressed image memory 263 is decompressed by decompressor 29 and transferred to output image memory 262. At the time of transfer to output image memory 22, transfer is possible by logic operation.

The image transferred to output image memory 262 is transferred to printer 13 through image bus B by means of DMAC 27, and printed on a sheet. At this time, by reading transfer counter of DMAC 27, it can be known to which portion of output image memory 262 the image has been transferred.

Copying operation of an original is performed utilizing the above described buses.

The image read by image reader 11 is placed in input image memory 261, and when one page of the image is read, the image is compressed by compressor 28 and the compressed image is transferred to compressed image memory 263. By transferring the compressed data to output image memory 262 through decompressor 29, the original image can be restored. By transferring the image to printer 13 through image bus B, the read image is printed.

By overlapping the image transferred to output image memory 262 with the screen patterns stored in ROM 24 by logic operation, the image can be screened.

Since compressed image memory 263 is capable of holding data of a plurality of images, sorting using the memory is possible, utilizing the functions described above.

First, a plurality of originals are continuously read. Thereafter, every time an image is read to input image memory 261, the image is compressed by compressor 28, and compressed image is held in compressed image memory 263. This operation is repeated successively, so that all the compressed images are held in compressed image memory 263. After the completion of this process, the images are decompressed from the first to nth page continuously by the decompressor 29, the images are transmitted to output image memory 262 and further to printer 13. By repeating decompression and output for the necessary number of times, it becomes possible to output images on a per original basis, and thus the so-called sorting operation which has been mechanically performed, can be done by utilizing the memory.

When the image on compressed image memory 263 is to be transferred to output image memory, logic operation is possible, and therefore images on compressed image memory can be combined.

Since a plurality of images can be placed in compressed image memory 263, a management table for managing the images (compressed image management table) is formed in system RAM 25.

The table stores image unit information. The image unit information includes image size before compression, a pointer indicating where the compressed image is stored in the compressed image memory, compression size, compression time, and information as to which one the original is among a series of originals.

In the structure in which image information stored in the memory is developed in the output image memory and output as described above, when a plurality of stored images are to be screened, combined and output, areas corresponding to two planes of images to be output is necessary if the respective images are developed and screened on separate areas and thereafter the images are combined.

In view of the foregoing, in the present embodiment, when a plurality of images stored in the memory are to be screened, combined and output, the screened images are developed on a page memory such that screen patterns of the images are superposed with each other, thus enabling development on the same area.

FIGS. 4A to 7E are illustrations showing the operation of screening in the image forming apparatus in accordance with one embodiment of the present invention.

The operation of screening in the image forming apparatus in accordance with one embodiment of the present invention will be described with reference to FIGS. 4A to 7E.

Figure 4A:
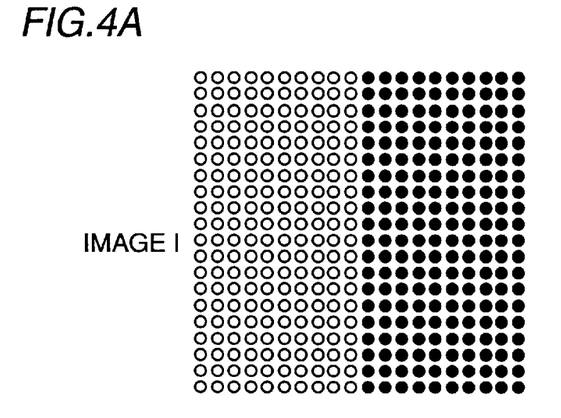
FIGS. 4A to 4C are illustrations showing screening operation of an image forming apparatus in accordance with one embodiment of the present invention.
Figure 4B:
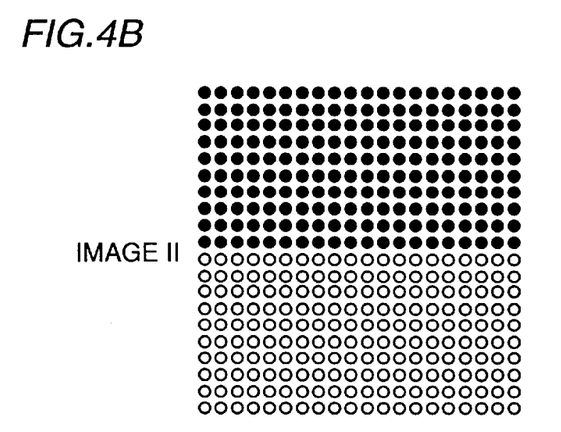

An example of screening process in the image forming apparatus of the present embodiment will be described in which an image I shown in FIG. 4A and an image II shown in FIG. 4B are screened with the same density and superposed with an image III shown in FIG. 4C. It is assumed that images I and II are screened with the density of a screen pattern α shown in FIG. 5A. FIGS. 5A and 5B represent minimum units of screening, each consisting of 4×4 dots in the present embodiment. FIG. 5A represents a halftone dot with low density including 1 dot (pattern α), and FIG. 5B represents a halftone dot with high density including 4 dots (pattern β). As can be seen from the figures, the dot of pattern α is set such that it is covered by the dot of pattern β when patterns α and β are superposed. When halftone dots of a pattern other than the patterns α and β are to be formed, when the pattern has the density higher than α and lower than β, the halftone dots are formed at positions covering pattern α and covered by pattern β. When the pattern is to have higher density than β, halftone dots are formed at positions covering pattern β.

Figure 4C:
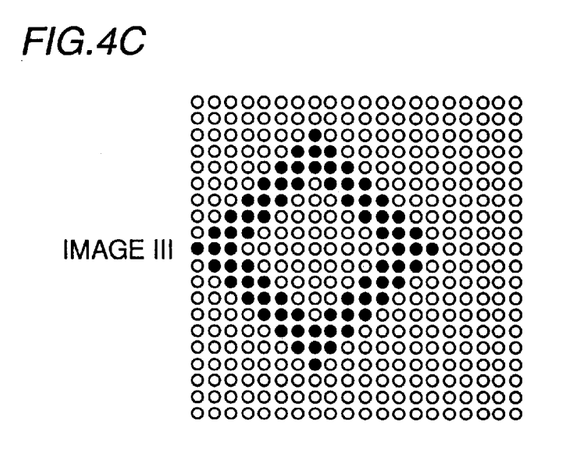
Figure 5A:
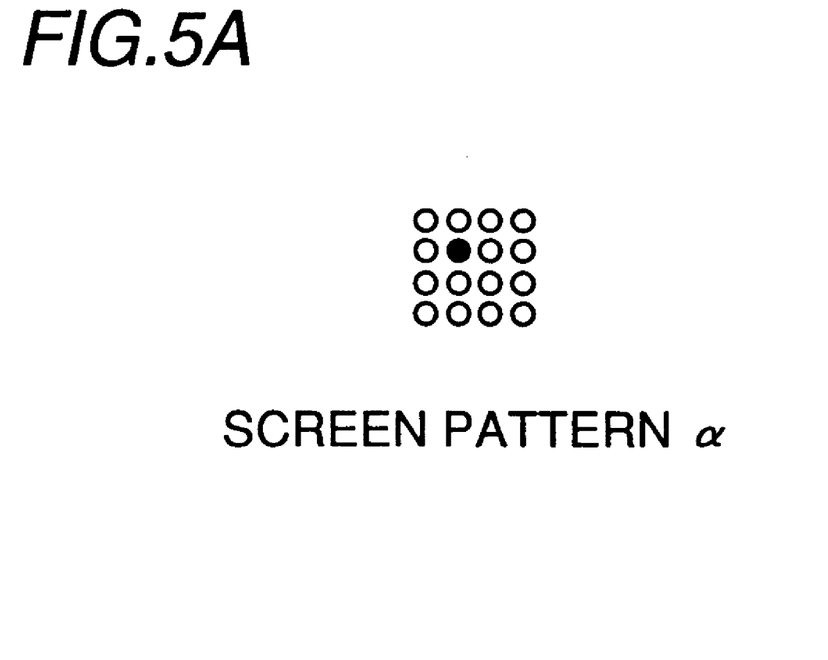
FIGS. 5A and 5B are illustrations showing the operation of screening of the image forming apparatus in accordance with the one embodiment of the present invention.
Figure 5B:
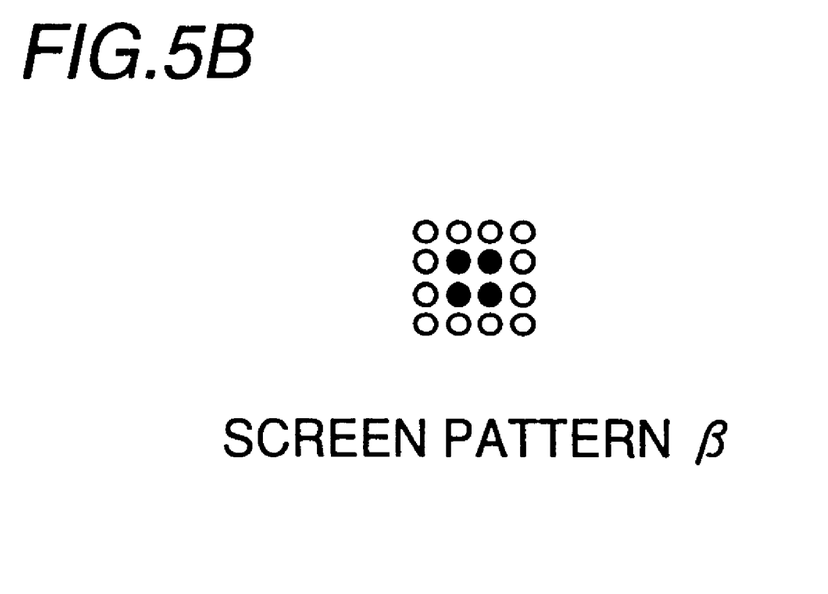
Figures 6A, 6D:
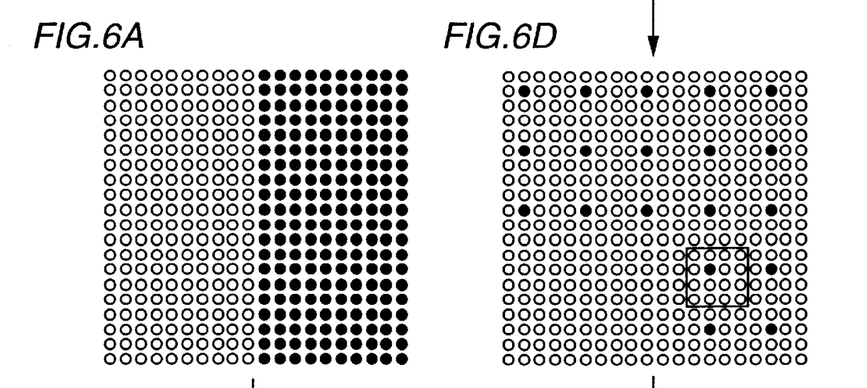
FIGS. 6A to 6E are illustrations showing the operation of screening of the image forming apparatus in accordance with the one embodiment of the present invention.
Figures 6B, 6E:
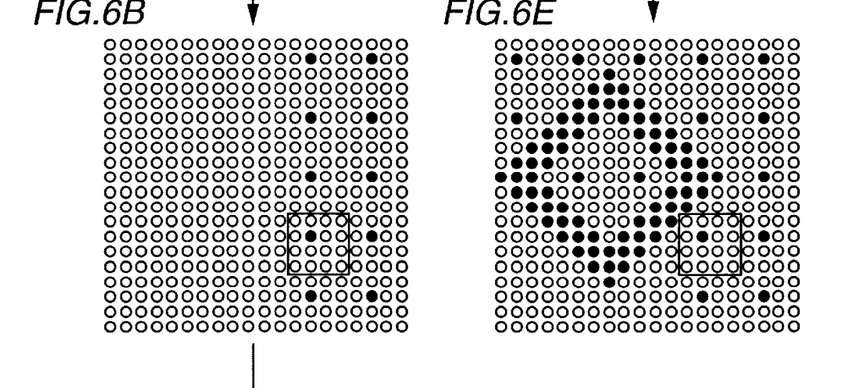
Figure 6C:
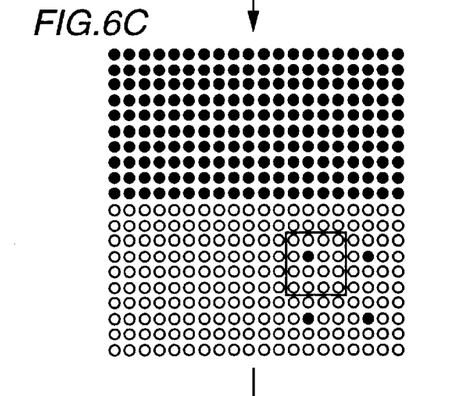

Referring to FIGS. 6A to 6E, in a mode in which image I shown in FIG. 4A and image II shown in FIG. 4B are screened with the same density and superposed on image III shown in FIG. 4C, at the time of decompression of compressed image data, first, image I on compressed image memory 263 is decompressed by decompressor 29 and transferred to the output page memory (see FIG. 6A). Thereafter, the image is developed overlapped with the screen pattern in ROM 24 by performing logic operation and AND, minimum unit by minimum unit of the screen pattern on the entire image on the output page memory (FIG. 6B). Thereafter, image II on compressed image memory 263 is decompressed by decompressor 29, logic operation of OR is performed in output page memory, and the image is superposed and transferred (see FIG. 6C). Thereafter, the screen pattern in ROM 24 is developsed superposed on the image on the output page memory by performing logic operation of AND minimum unit by minimum unit of screen pattern (see FIG. 6D). At this time, the image is developed such that the screen pattern is superposed precisely aligned therewith. Thereafter, image III on compressed image memory 263 is decompressed by decompressor 29, logic operation of OR is performed in the output page memory, and the images are transferred superposed with each other (see FIG. 6E). When development of all the images to output image memory 262 is completed in this manner, process for transferring the images on image memory 262 to printer 13 starts.

Another example of screening process in the image forming apparatus of the present embodiment will be described in which image I shown in FIG. 4A and image II shown in FIG. 4B are screened with different densities and superposed on image III shown in FIG. 4C. It is assumed that image I is screened with screen pattern α shown in FIG. 5A and image II is screened with screen pattern β shown in FIG. 5B.

Figure 7A:
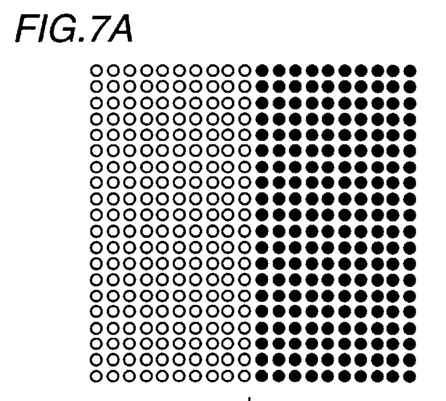
FIGS. 7A to 7E are illustrations showing the operation of screening of the image forming apparatus in accordance with the one embodiment of the present invention.
Figure 7B:
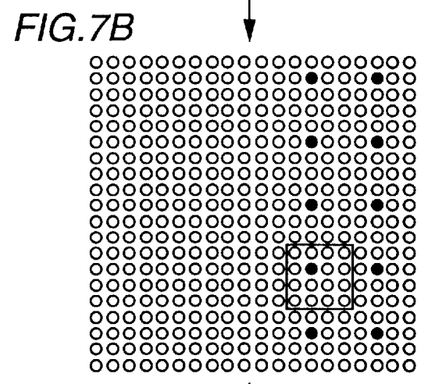
Figure 7C:
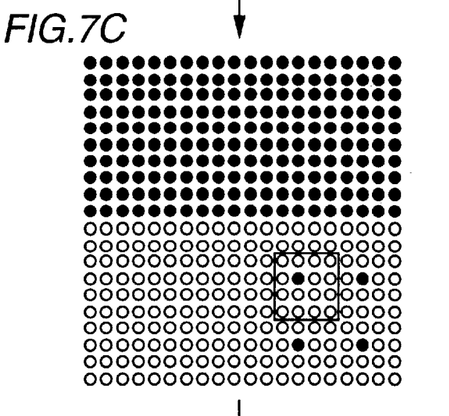
Figure 7D:
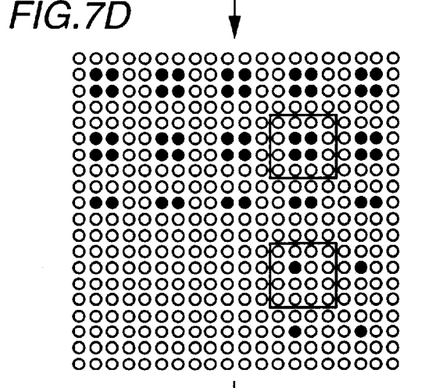
Figure 7E:
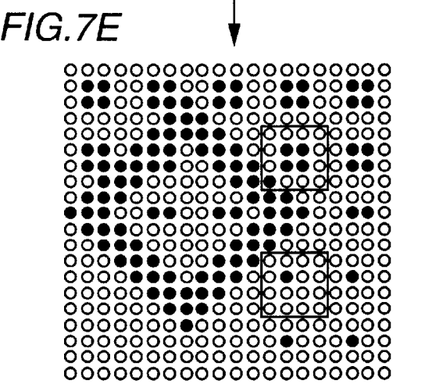

Referring to FIG. 7, in a mode in which image I shown in FIG. 4A and image II shown in FIG. 4B are screened with different densities and superposed with image III shown in FIG. 4C, at the time of decompression of the compressed image data, first, image I for which density of screening is lower is decompressed by decompressor 29 from compressed image memory 263 and transferred to output page memory (FIG. 7A). Thereafter, the screen pattern corresponding to the screen density of the first image in ROM 24 is developed superposed with the image by logic operation of AND, minimum unit by unit of screen pattern on the entire image on the output page (see FIG. 7B). Thereafter, image II of the compressed image memory is decompressed by decompressor 29 and transferred to the output page memory (see FIG. 7C). Thereafter, the screen pattern corresponding to the screen density for image II in ROM 24 is developed superposed by logic operation of AND, minimum unit by minimum unit of screen pattern, with the entire image on the output page memory (see FIG. 7B). At this time, the pattern is developed such that the screen pattern for image II covers the screen pattern of image I. Thereafter, image III on compressed image memory 263 is decompressed by decompressor 29, logic operation of OR is performed on the output page memory, and the images are transferred superposed with each other (see FIG. 7E). When development of all the images to output image memory 262 is completed in this manner, a process for transferring images on output image memory 262 to printer 13 starts.

As described above, according to the present embodiment, even when a plurality of images stored in the memory are to be screened, combined and output, images can be developed on the same area by developing the images with screen patterns of respective screen images superposed on the page memory, and therefore it becomes possible to screen and superpose a plurality of images without increasing memory capacity.

The flow of control of the image forming apparatus in accordance with the present invention will be described with reference to FIGS. 8 to 20.

Figure 8:
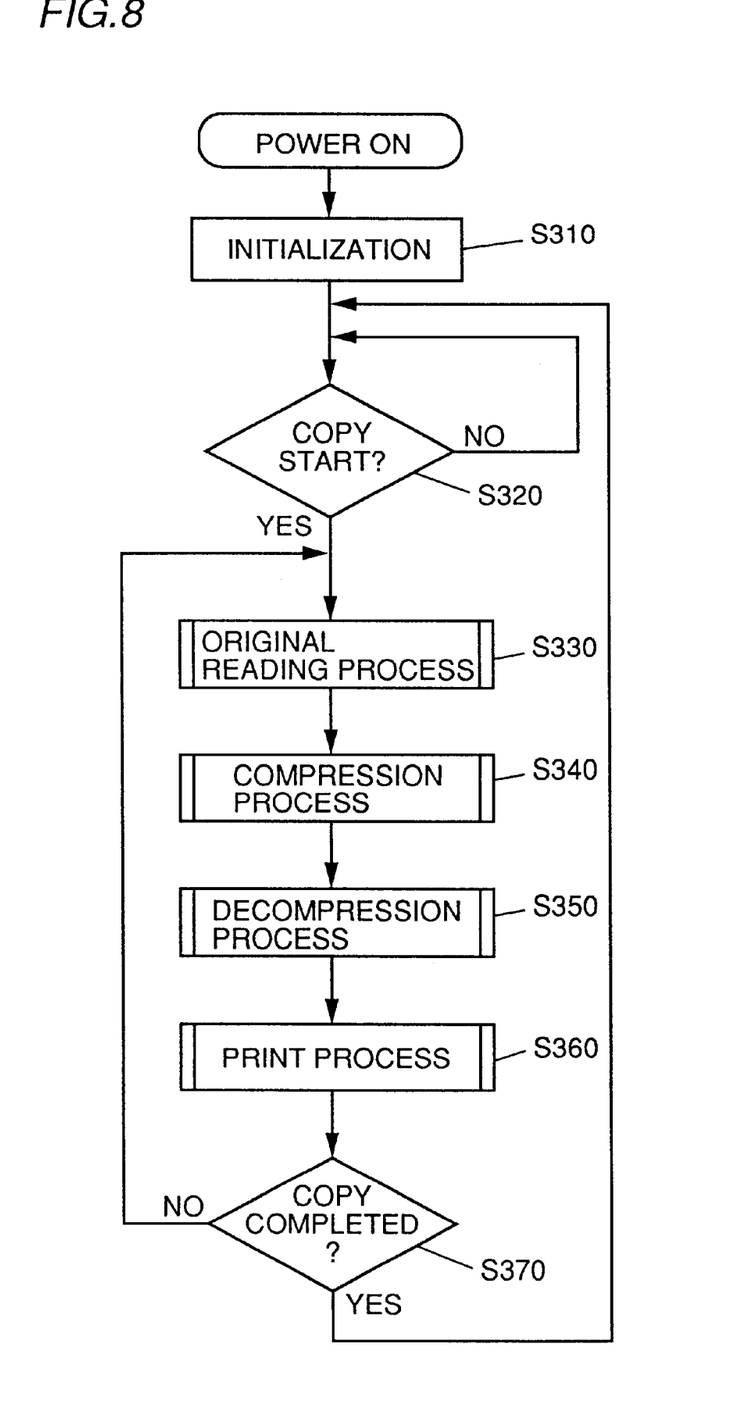
FIG. 8 is a flow chart of an example of a control main routine in an image memory portion of the image forming apparatus in accordance with the one embodiment of the present invention.

FIG. 8 is a flow chart showing an example of a main routine of control in the image memory of the image forming apparatus in accordance with the present embodiment.

Referring to FIG. 8, when the power is turned on, inner status and the like are initialized (S310), and whether copy start is instructed or not is determined (S320). Until copy start is instructed, the control is in a standby loop. Meanwhile, when copy start is instructed, original reading (S330), compression (S340), decompression including combining of images (S350) and printing (S360) are performed successively. Thereafter, whether copying is completed or not is determined (S370), and these processings (S330 to S360) are repeated until copying operation is completed. When the copying operation is completed, whether copy start is again instructed or not is determined (S320).

Figure 9:
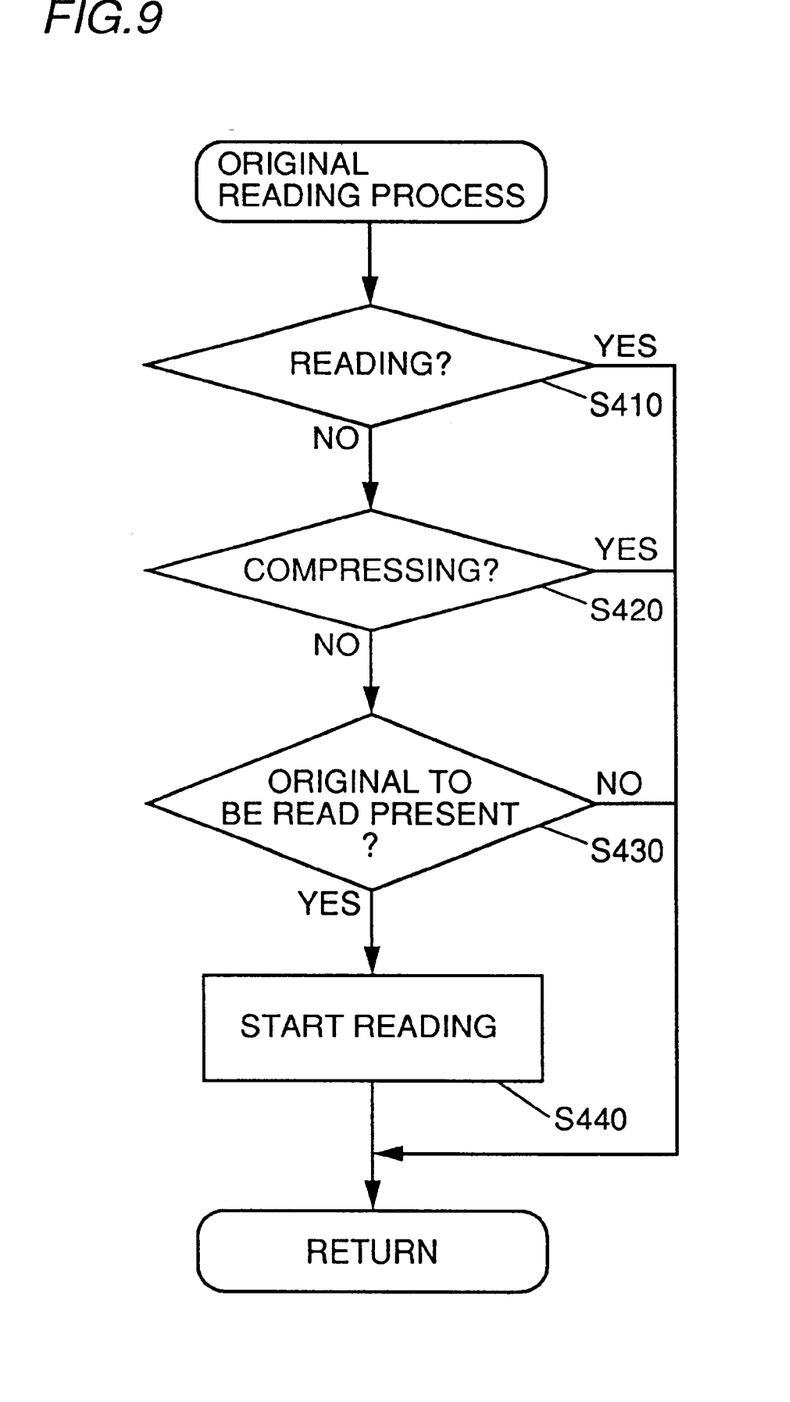
FIG. 9 is a flow chart showing original reading process which is one of the subroutines in the main routine shown in FIG. 3.

FIG. 9 is a flow chart showing original reading process, which is one of the subroutines of the main routine shown in FIG. 8.

Referring to FIG. 9, whether or not an original is being read, that is, whether or not an image is being transferred from image reader 11 to input image memory 261 of image memory 12 is determined (S410).

When an original is being read, original reading subroutine returns without performing the original reading process. If any original is not being read, whether compression is in progress or not is determined (S420).

When compression is being in progress, original reading subroutine returns without performing the original reading process. If not, whether or not there is an original to be read is determined (S430).

When there is not an original to be read, original reading subroutine returns without performing the original reading process. When there is an original to be read, original reading starts (S440). The original reading process specifically refers to the process in which DMAC 27 is started and a read request is issued to image reader 11 through control signal line a. Details of reading operation is not described, as the details are the same as the prior art technique.

Figure 10:
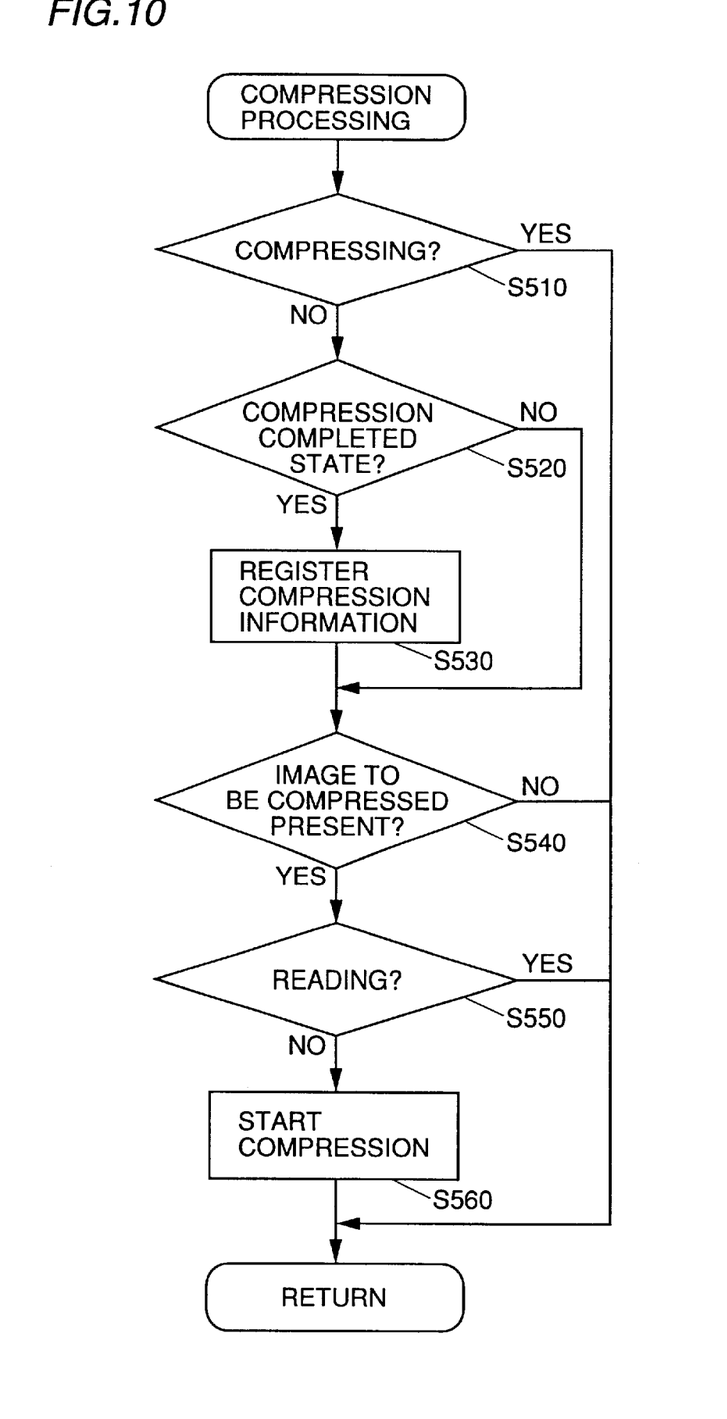
FIG. 10 is a flow chart showing compression process which is one of the subroutines in the main routine shown in FIG. 8.

FIG. 10 is a flow chart showing the compression process which is one of the subroutines of the main routine shown in FIG. 8.

Referring to FIG. 10, whether or not compression is being performed is determined (S510).

When compression is being performed, compression process subroutine returns to maintain flow without performing compression process. If not, whether it is a compression completed state immediately after compression or not is determined (S520).

When it is not the compression completed state immediately after compression, whether there is an image to be compressed or not is determined (S540). If it is the compression completed state immediately after compression, compression information of the compressed image is registered in the aforementioned compressed image management table (S530), and thereafter whether there is an image to be compressed or not is determined (S540).

When there is not an image to be compressed, compression process subroutine returns to main flow without performing compression process. When there is an image to be compressed, whether an original is being read or not is determined (S550). When reading is being performed, compression processing is not performed. If not, image compression starts (S560). Here, compressor 28 is operated, and the image in input image memory 261 is applied to compressor 28 and compressed image is transferred to compressed image memory 263. This image transfer is performed by DMAC 27. How much the read image is transferred to input image memory 261 can be confirmed by reading transfer counter of DMAC 27.

Figure 11:
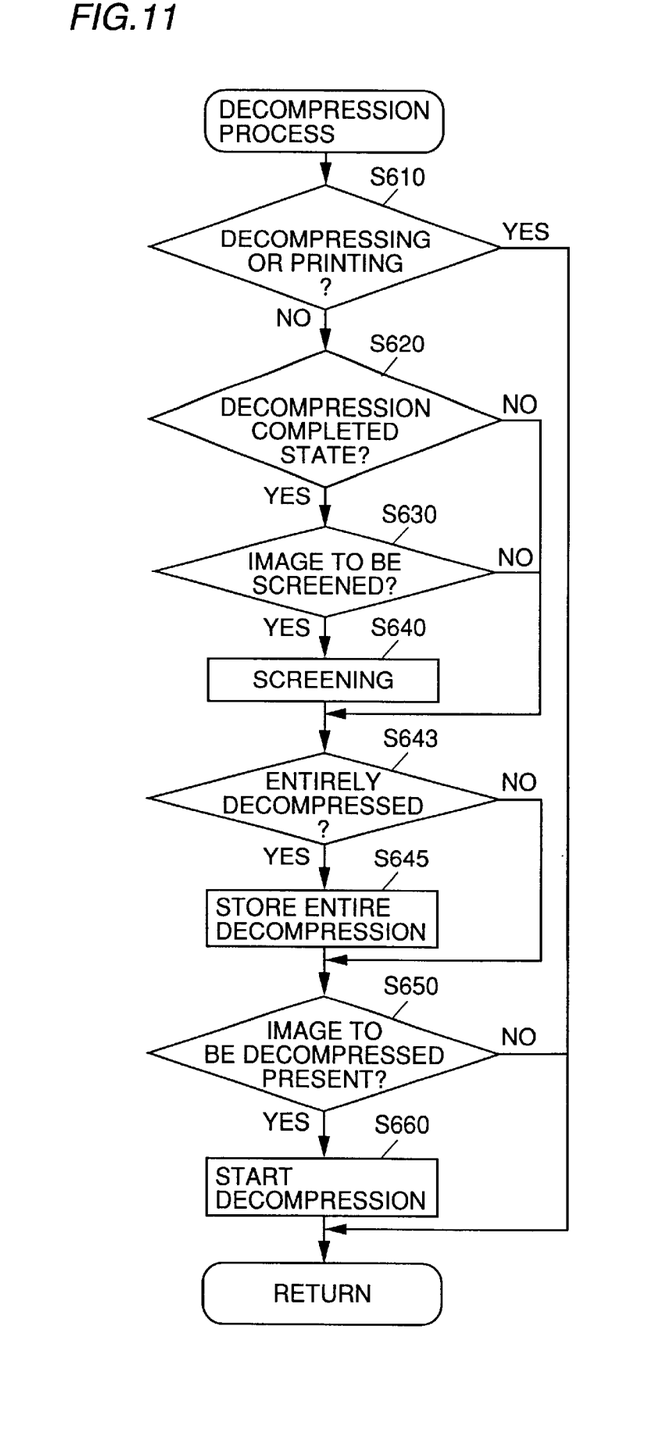
FIG. 11 is a flow chart showing decompression process which is one of the subroutines in the main routine of FIG. 8.

FIG. 11 is a flow chart showing decompression process which is one of the subroutines of the main routine shown in FIG. 8.

Referring to FIG. 11, whether decompression or printing is being performed is determined (S610).

When decompression or printing is being performed, decompression processing subroutine returns without performing decompression process. If neither decompression nor printing is being performed, whether it is decompression of one image completed state or not is determined (S620).

If it is not the decompression completed state, whether there is an image to be decompressed or not is determined (S650). Meanwhile, if it is decompression completed state, whether the image is to be screened or not is determined (S630).

If it is not the image to be screened, whether or not there is an image to be decompressed is determined (S650). If it is an image to be screened, screening is performed (S640). Here, whether or not all decompression is completed or not is determined (S643), and if the image is entirely decompressed, completion of decompressing is stored (S645).

Thereafter, whether there is an image to be decompressed or not is determined in accordance with the aforementioned compressed image management table (S650). If there is not an image to be decompressed, decompression process subroutine returns without performing decompression process. When there is an image to be decompressed, decompression starts (S660). Decompression starts by starting operation of decompressor 29. Image transfer is performed by DMAC 27. When it is an image combining mode and there are a plurality of images to be decompressed, decompression starts from the one having lower density of screening.

Figure 12:
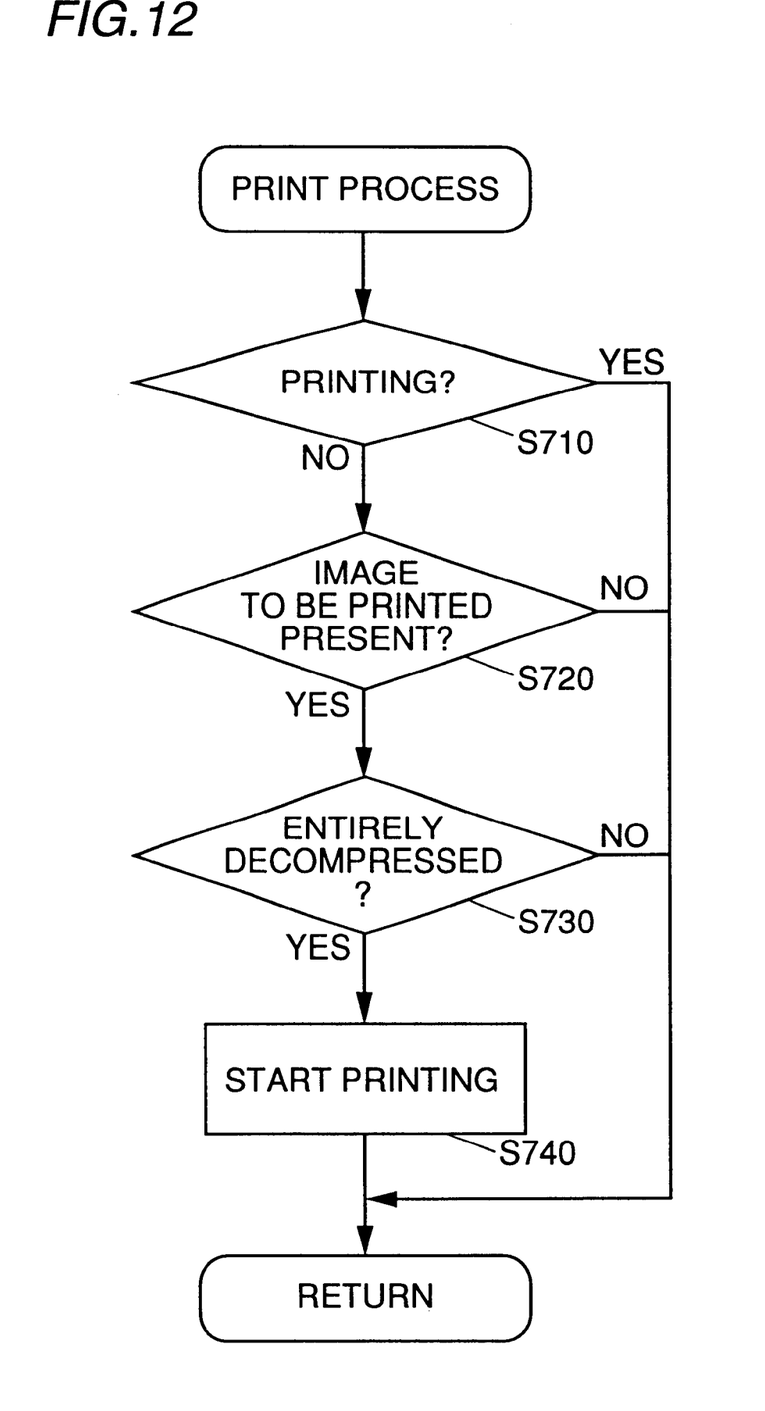
FIG. 12 is a flow chart showing printing process which is one of the subroutines of the main routine shown in FIG. 8.

FIG. 12 is a flow chart showing print process which is one of the subroutines of the main routine shown in FIG. 8.

Referring to FIG. 12, first, whether printing is being performed or not is determined (S710).

When printing is being performed, print process subroutine returns without performing printing process. If printing is not being performed, whether there is an image to be printed or not is determined (S720).

When there is not an image to be printed, print process subroutine returns without performing printing process. When there is an image to be printed, whether decompression has been completed or not is determined (S730).

When decompression is not yet completed, print process subroutine returns without performing printing process. Meanwhile, if decompression has been completed, printing starts (S740). Here, printing is performed by starting DMAC 27 and requesting paper feed and printing operation to printer 13 through control signal line a. Since details of print processings are the same as in a conventional printer. Description thereof is not repeated.

Though the minimum unit of screening was 4×4 dots in the above embodiment, it is not limited thereto. In the above described embodiment, screen patterns are formed such that the screen patterns are overlapped when minimum units of screening are superposed with each other and that halftone dot of lower density is covered by a halftone dot of higher density. However, the patterns are not limited thereto. Any superposing in which screen patterns are overlapped when a plurality of images are superposed with each other or in which halftone dots of lower density is covered by a halftone dot of higher density is within the scope of the present invention. Though a digital copying machine has been described in the embodiment above, the present invention is not limited thereto. A system in which image read by an image reader or an image stored in advance or an image received from other apparatus is processed to be displayed or output, or an image processing apparatus forming part of such system is within the scope of the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus including an image reader for reading an image and a printer for printing the image read by said image reader, comprising:

a page memory for developing, with screening, a plurality of images read by the image reader; and a controller for developing the plurality of images on said page memory such that screen patterns of the data of the plurality of images are superposed on said page memory.

2. The image forming apparatus according to claim 1, further comprising:

an input image memory for storing an image read by said image reader.

3. The image forming apparatus according to claim 1, further comprising:

a compression circuit for compressing an image read by said image reader.

4. The image forming apparatus according to claim 3, further comprising:

an image memory for storing a plurality of compressed images, and a decompression circuit for decompressing stored images.

5. The image forming apparatus according to claim 1, further comprising:

a memory for storing a plurality of images read by said image reader.

6. A image forming apparatus including an image reader for reading an image, and a printer for printing an image read by the image reader, comprising:

a page memory for developing, with screening of mutually different densities, a plurality of images read by the image reader; and a controller for developing the plurality of images on said page memory such that a screen pattern having low density of the plurality of images is covered by a screen pattern with higher density on the page memory.

7. The image forming apparatus according to claim 6, further comprising:

an input image memory for storing an image read by said image reader.

8. The image forming apparatus according to claim 6, further comprising:

a compression circuit for compressing an image read by said image reader.

9. The image forming apparatus according to claim 8, further comprising:

an image memory for storing a plurality of compressed images and a decompression circuit for decompressing stored images.

10. The image forming apparatus according to claim 6, further comprising:

a memory for storing a plurality of images read by said image reader.

11. An image forming apparatus, comprising:

a page memory for developing, with screening, a plurality of images; and a controller for developing the plurality of images on the page memory such that screen patterns of the plurality of images are superposed on the page memory.

12. The image forming apparatus according to claim 11, wherein said images are input from a memory.

13. The image forming apparatus according to claim 11, wherein said images are compressed.

14. The image forming apparatus according to claim 13, further comprising:

a decompression circuit for decompressing images.

15. An image forming apparatus, comprising:

a page memory for developing, with screening, a plurality of images; and a controller for developing the plurality of images on the page memory such that a screen pattern having low density of the plurality of images is covered by a screen pattern of higher density on said page memory.

16. The image forming apparatus according to claim 15, wherein said images are input from a memory.

17. The image forming apparatus according to claim 15, wherein said images are compressed.

18. The image forming apparatus according to claim 17, further comprising:

a decompression circuit for decompressing images.

19. A method for image forming, comprising the steps of:

transferring a first image from an image memory to a page memory;

screening the first image with a first screen pattern on the page memory to form a first screened image;

transferring a second image from the image memory to the page memory such that the second image is superposed on the first screened image; and screening the second image with a second screen pattern on the page memory to form a second screened image, wherein the first and second screened images are superposed on the page memory.

20. The method of claim 19, wherein the first and second screen patterns are different densities.

21. The method of claim 19, wherein the step of transferring a first image includes the step of decompressing the first image before transferring the first image to the page memory.

22. The method of claim 19, wherein the step of transferring a second image includes the step of decompressing the second image before transferring the second image to the page memory.

* * * * *